(12) United States Patent
Guo

(10) Patent No.: US 12,470,234 B2
(45) Date of Patent: Nov. 11, 2025

(54) SINGLE INDUCTOR WITH TUNING CAPABILITY FOR ANTENNA SWITCHING MODULE TO OPERATE FREQUENCY BANDS IN A MULTI-BAND RADIO FREQUENCY DEVICE

(71) Applicant: Skyworks Solutions, Inc., Irvine, CA (US)

(72) Inventor: Jiunn-Sheng Guo, Eastvale, CA (US)

( * ) Notice: Subject to any disclaimer, the term of this patent is extended or adjusted under 35 U.S.C. 154(b) by 494 days.

(21) Appl. No.: 17/954,608

(22) Filed: Sep. 28, 2022

(65) Prior Publication Data

US 2023/0103039 A1 Mar. 30, 2023

Related U.S. Application Data

(60) Provisional application No. 63/261,798, filed on Sep. 29, 2021, provisional application No. 63/261,797, filed on Sep. 29, 2021.

(51) Int. Cl.
*H04B 1/00* (2006.01)
*H03H 7/38* (2006.01)
*H04B 1/40* (2015.01)
*H04B 1/44* (2006.01)

(52) U.S. Cl.
CPC ............. *H04B 1/0057* (2013.01); *H03H 7/38* (2013.01); *H04B 1/40* (2013.01); *H04B 1/44* (2013.01)

(58) Field of Classification Search
CPC .... H04B 1/005; H04B 1/0053; H04B 1/0057; H04B 1/006; H04B 1/40; H04B 1/401; H04B 1/44; H03H 7/38; H03H 7/383; H03H 2007/386
See application file for complete search history.

(56) References Cited

U.S. PATENT DOCUMENTS

| | | | |
|---|---|---|---|
| 8,786,079 B2 | 7/2014 | Lee et al. | |
| 8,928,426 B2 | 1/2015 | Li et al. | |
| 8,928,427 B2 | 1/2015 | Li et al. | |
| 8,941,449 B2 | 1/2015 | Li et al. | |
| 8,987,061 B2 | 3/2015 | Lee et al. | |
| 9,240,811 B2* | 1/2016 | Norholm | H04B 1/56 |
| 9,749,003 B2* | 8/2017 | Zhao | H04B 1/48 |
| 9,806,395 B2 | 10/2017 | Li et al. | |
| 9,865,922 B2* | 1/2018 | Kerr | H01Q 5/335 |
| 9,966,982 B2* | 5/2018 | Ripley | H04B 1/0458 |
| 10,256,523 B2 | 4/2019 | Li et al. | |
| 10,348,340 B2 | 7/2019 | Cook | |
| 10,483,641 B2 | 11/2019 | Lehtola | |
| 12,003,263 B2 | 6/2024 | Jia et al. | |
| 12,191,826 B2 | 1/2025 | Domino et al. | |

(Continued)

FOREIGN PATENT DOCUMENTS

WO WO 2017/104454 6/2017

OTHER PUBLICATIONS

US 11,722,163 B2, 08/2023, Jia et al. (withdrawn)

*Primary Examiner* — Quochien B Vuong
(74) *Attorney, Agent, or Firm* — Knobbe Martens Olson & Bear LLP

(57) ABSTRACT

A multi-band radio frequency device uses a single tuning inductor and a multiple pole switch that switches small inductors in series with the tuning inductor provide tuning capability for the antenna switching module to operate over different frequency bands. The single tuning inductor replaces individual tuning inductors for each frequency band.

18 Claims, 11 Drawing Sheets

(56) References Cited

U.S. PATENT DOCUMENTS

| | | |
|---|---|---|
| 12,237,815 B2 | 2/2025 | Domino et al. |
| 2013/0222060 A1 | 8/2013 | Lo |
| 2014/0320205 A1 | 10/2014 | Lyalin |
| 2016/0093578 A1 | 3/2016 | Penunuri |
| 2018/0006626 A1 | 1/2018 | Lyalin et al. |
| 2022/0255567 A1 | 8/2022 | Guo et al. |
| 2022/0345103 A1 | 10/2022 | Guo et al. |
| 2023/0097428 A1 | 3/2023 | Guo |
| 2023/0103039 A1 | 3/2023 | Guo |
| 2023/0163745 A1 | 5/2023 | Guo et al. |
| 2023/0188165 A1 | 6/2023 | Xu |
| 2023/0216527 A1 | 7/2023 | Raghavan |
| 2023/0231587 A1 | 7/2023 | Guo et al. |
| 2023/0315963 A1 | 10/2023 | Guo |
| 2023/0318634 A1 | 10/2023 | Guo et al. |
| 2023/0318646 A1 | 10/2023 | Jia |
| 2024/0297674 A1 | 9/2024 | Jia |
| 2025/0167815 A1 | 5/2025 | Machnoor |

\* cited by examiner

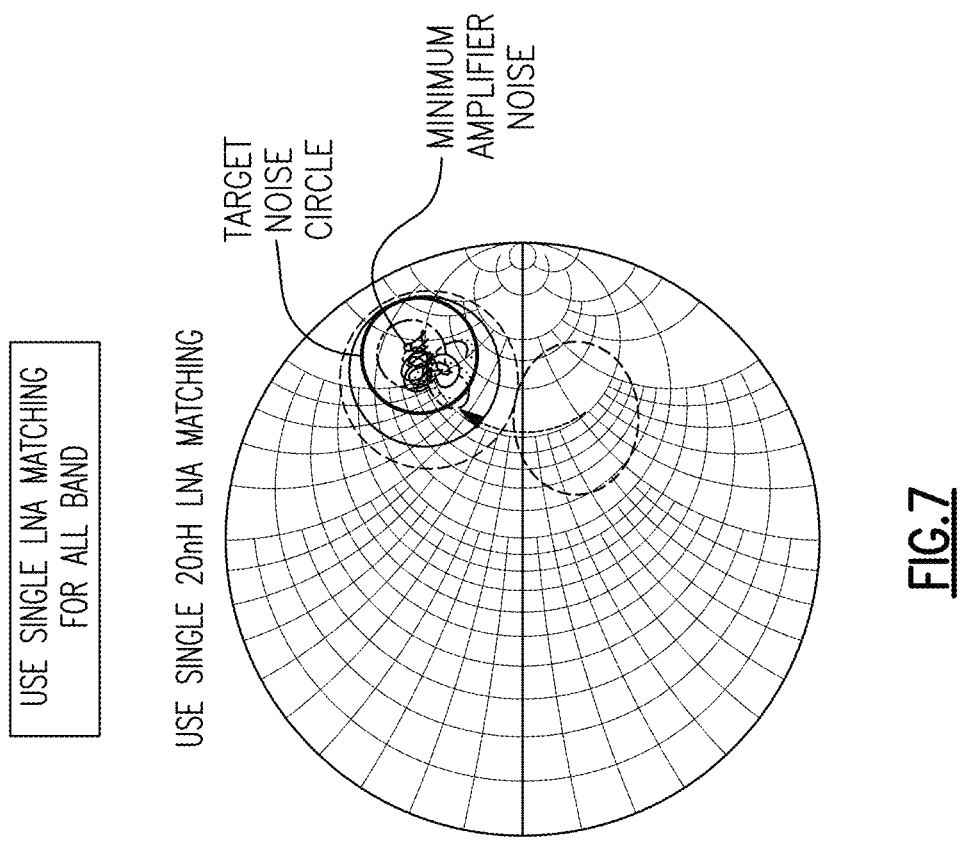

SINGLE INDUCTOR WITH TUNING CAPABILITY FOR ANTENNA SWITCHING MODULE TO OPERATE FREQUENCY BANDS IN A MULTI-BAND RADIO FREQUENCY DEVICE

CROSS REFERENCE TO PRIORITY APPLICATIONS

Any and all applications for which a foreign or domestic priority claim is identified in the Application Data Sheet as filed with the present application are hereby incorporated by reference under 37 C.F.R. § 1.57.

BACKGROUND

Field

Embodiments of the invention relate to electronic systems, and in particular, to radio frequency electronics.

Description of Related Technology

Radio frequency (RF) communication systems can be used for transmitting and/or receiving signals of a wide range of frequencies. For example, an RF communication system can be used to wirelessly communicate RF signals in a frequency range of about 30 kHz to 300 GHz, such as in the range of about 410 MHz to about 7.125 GHz for fifth generation (5G) communications using Frequency Range 1 (FR1).

Examples of RF communication systems include, but are not limited to, mobile phones, tablets, base stations, network access points, customer-premises equipment (CPE), laptops, and wearable electronics.

SUMMARY

The innovations described herein each have several aspects, no single one of which is solely responsible for its desirable attributes. Without limiting the scope of the claims, some prominent features of this disclosure will now be briefly described. One aspect of this disclosure can be a front end module comprising a plurality of duplexers, each duplexer configured to receive radio frequency signals within a specific frequency band of a plurality of frequency bands; and a single impedance matching inductor configured to provide impedance matching for a plurality of receive signal paths between receive nodes of the plurality of duplexers and at least one low noise amplifier.

The front end module can further comprise at least one antenna configured to receive radio frequency signals within the plurality of frequency bands.

The front end module can further comprise an antenna switching module in communication with the at least one antenna and having a plurality of first switch positions, the antenna switching module configured to provide communication, responsive to a first control signal, between the at least one antenna and a selected duplexer of the plurality of duplexers.

The front end module can further comprise a first low noise amplifier switch in communication with a first end of the single impedance matching inductor and having a plurality of second switch positions, the first low noise amplifier switch configured to provide communication, responsive to a second control signal, between the single impedance matching inductor and a selected duplexer of the plurality of duplexers.

The at least one low noise amplifier can be a shared low noise amplifier that can be configured to amplify the receive radio frequency signals in each frequency band of the plurality of frequency bands. The shared low noise amplifier can be configured to receive the receive radio frequency signal at a second end of the single impedance matching inductor.

The at least one low noise amplifier can include a plurality of low noise amplifiers, each low noise amplifier of the plurality of low noise amplifiers can be configured to amplify the receive radio frequency signal from a specific frequency band of the plurality of frequency bands.

The front end module can further comprise a second low noise amplifier switch in communication with a second end of the single impedance matching inductor, the second low noise amplifier switch can be configured to be in communication with a selected low noise amplifier of the plurality of low noise amplifiers.

The selected low noise amplifier can be in communication with the second end of the single impedance matching inductor via the second low noise amplifier switch. The selected low noise amplifier can be associated with the selected duplexer. The single impedance matching inductor can be a surface mount inductor.

The front end module can further comprise at least one receiver configured to process the receive radio frequency signals, where the at least one receiver can include a filter that can be adjusted to provide additional impedance matching functionality.

One aspect of this disclosure can be a multi-band radio frequency device comprising at least one antenna configured to receive and transmit radio frequency signals within a plurality of frequency bands; a plurality of duplexers, each duplexer configured to receive radio frequency signals within a specific frequency band of the plurality of frequency bands; and a single impedance matching inductor configured to provide impedance matching for a plurality of receive signal paths between receive nodes of the plurality of duplexers and at least one low noise amplifier.

The at least one antenna can include a plurality of antennas, each antenna can be configured to receive and transmit radio frequency signals for a different frequency band of the plurality of frequency bands.

The multi-band radio frequency device can further comprise an antenna switching module in communication with the at least one antenna and having a plurality of first switch positions, the antenna switching module can be configured to provide communication, responsive to a first control signal, between the at least one antenna and a selected duplexer of the plurality of duplexers.

The multi-band radio frequency device can further comprise a first low noise amplifier switch in communication with a first end of the single impedance matching inductor and having a plurality of second switch positions, the first low noise amplifier switch can be configured to provide communication, responsive to a second control signal, between the single impedance matching inductor and a selected duplexer of the plurality of duplexers.

The single impedance matching inductor can be a surface mount inductor. The multi-band radio frequency device can further comprise at least one receiver configured to process the receive radio frequency signals, where the at least one receiver can include a filter that can be adjusted to provide additional impedance matching functionality.

The at least one low noise amplifier can be a shared amplifier that can be configured to amplify the receive radio frequency signals in each frequency band of the plurality of frequency bands.

The at least one low noise amplifier can include a plurality of low noise amplifiers, each low noise amplifier of the plurality of low noise amplifiers can be configured to amplify the receive radio frequency signal from a specific frequency band of the plurality of frequency bands.

One aspect of this disclosure can be a front end module comprising a plurality of duplexers, each duplexer configured to transmit and receive radio frequency signals within a specific frequency band of a plurality of frequency bands; an antenna switch in communication with an antenna and having a plurality of switch positions, the antenna switch configured to provide communication, responsive to a control signal, between the antenna and a selected duplexer of the plurality of duplexers; and a single tuning inductor configured to provide tuning for the antenna switch for each of the plurality of switch positions.

The single tuning inductor can be a surface mount device. The single tuning inductor has a first end in communication with the antenna and the antenna switch. The single tuning inductor has a second end in communication with ground.

The front end module can further comprise a tuning switch having a pole and a plurality of throws, wherein the single tuning inductor has a second end in communication with the pole of the tuning switch.

The tuning switch can be a single pole triple throw switch. The front end module can further comprise a plurality of second inductors, where each second inductor can be connected between a corresponding throw and ground. The tuning switch and the plurality of second inductors can provide additional tuning capability.

The tuning switch and the plurality of second inductors can be implemented as embedded traces on a multi-layer circuit board. The plurality of second inductors can be surface mount devices. The antenna switching module includes the antenna switch.

One aspect of this disclosure can be a multi-band radio frequency device comprising an antenna configured to receive and transmit radio frequency signals within a plurality of frequency bands; a plurality of duplexers, each duplexer configured to receive radio frequency signals within a specific frequency band of the plurality of frequency bands; and an antenna switching module in communication with an antenna and having a plurality of switch positions, the antenna switching module configured to provide communication, responsive to a control signal, between the antenna and a selected duplexer of the plurality of duplexers; and a single tuning inductor configured to provide tuning for the antenna switching module for each of the plurality of switch positions.

The single tuning inductor has a first end in communication with the antenna and the antenna switching module. The single tuning inductor has a second end in communication with ground. The multi-band radio frequency device can further comprise a tuning switch having a pole and a plurality of throws, where the single tuning inductor can have a second end in communication with the pole of the tuning switch.

The multi-band radio frequency device can further comprise a plurality of second inductors, wherein each second inductor can be connected between a corresponding throw and ground. The tuning switch can be switched, responsive to a second control signal, to place a selected second inductor in series with the single tuning inductor.

The tuning switch and the plurality of second inductors can provide additional tuning capability. The tuning switch and the plurality of second inductors can be implemented as embedded traces on a multi-layer circuit board. The plurality of second inductors can be surface mount devices.

BRIEF DESCRIPTION OF THE DRAWINGS

FIG. 7 is one example of a plot illustrating the impedances associated with a multi-band radio frequency device including multiple duplexers, after adding a single LNA matching impedance that provides the matching impedance for all of the bands.

DETAILED DESCRIPTION OF EMBODIMENTS

Figure 1:
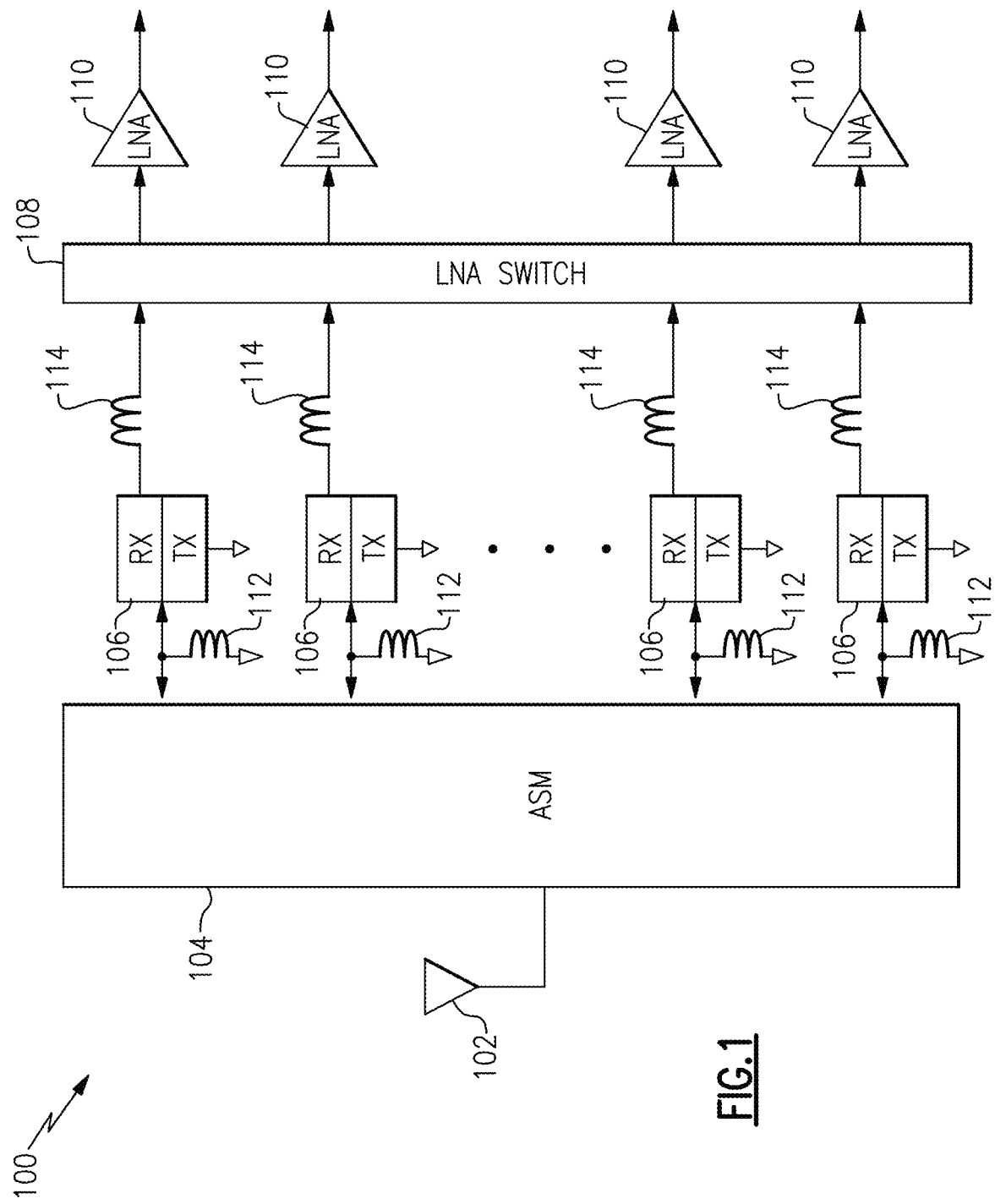
FIG. 1 is a schematic diagram of one example of a multi-band radio frequency device.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

FIG. 1 is a schematic diagram of one example of a multi-band radio frequency device 100 comprising at least one antenna 102, an antenna switching module 104, a plurality of tuning inductors 112, a plurality of duplexers 106, a plurality of matching inductors, a low noise amplifier (LNA) switch 108, and a plurality of low noise amplifiers 110. The multi-band radio frequency device 100 is a communication device that supports multiple radio frequency bands. The signal path for each frequency band can be associated with a tuning inductor 112, a duplexer 106, a matching inductor 114, and a low noise amplifier 110. The at least one antenna 102 receives and transmits radio frequency signals. The antenna switching module 104 comprises an antenna switch that is switched to provide a signal path from the at least one antenna 102 to the duplexer 106 associated with the frequency band of the radio frequency signal. A baseband system (not illustrated) of the multi-band radio frequency device 100 provides control signals to the antenna switching module 104 to control the switching such that a received radio frequency signal is routed to the selected duplexer 106 and a radio frequency for transmission is routed from the selected duplexer 106 to the at least one antenna 102.

Each duplexer 106 is associated with a tuning inductor 112. The tuning inductor 112 is used to tune the associated duplexer 106 for its associated frequency band. Each tuning inductor 112 may have a different value, which can depend on the requirements of the specific frequency band. As illustrated in FIG. 1, a first end of the tuning inductor 112 is connected to the signal path between the antenna switch module 104 and the associated duplexer 106 and a second end of the tuning inductor 112 is connected to ground. This can be considered a shunt inductor 112 between each duplexer 106 and the antenna switching module 104. For multi-band applications, the multi-band radio frequency device 100 may operate many frequency bands, each band utilizing a duplexer 106 and a tuning inductor 112. For example, a low-band module with ten duplexers 106 includes ten tuning inductors 112. In highly compact module design, conserving space and reducing costs are important. Disadvantageously, the tuning inductors 112 occupy a lot of space and increase the cost of the multi-band radio frequency device 100.

A duplexer is an electronic device that allows bi-directional (duplex) communication over a single path. The duplexer 106 provides isolation between the receiver and the transmitter (not illustrated) while permitting them to share an antenna. Each duplexer 106 includes a receive path (RX) to pass radio frequency signals received by the at least one antenna 102 to the low noise amplifier 110 for further processing by the receiver (not illustrated). Each duplexer 106 further includes a transmit path (TX) to pass radio frequency signals from the transmitter (not illustrated) via a power amplifier (not illustrated) to the at least one antenna 102 for transmission. Each duplexer 106 operates for a different frequency band of the radio frequency spectrum that is utilized by the multi-band radio frequency device 100.

When the multi-band radio frequency device 100 is operating to transmit radio frequency signals, the at least one antenna 102 receives the radio frequency signals for transmission from the selected duplexer 106. When the multi-band radio frequency device 100 is operating to receive radio frequency signals, the selected duplexer 106 receives radio frequency signals from the at least one antenna 102 via the antenna switching module 104. As shown in FIG. 1, each receive radio frequency signal path includes the matching inductor 114, the LNA switch 108, and a low noise amplifier 110.

Each duplexer 106 is associated with an impedance matching inductor 114. The matching inductors 114 provide impedance matching for the received radio frequency signal at the input to the associated low noise amplifier 110. Each matching inductor 114 is located between the output of the receive node of the duplexer 106 and the associated low noise amplifier 110. For example, a first end of the matching inductor 114 is in communication with an output of the receiver of the duplexer 106 and a second end of the matching inductor 114 is in communication with an input of the selected low noise amplifier 110 via the LNA switch 108.

The multi-band radio frequency device 100 may operate many frequency bands, each band utilizing at least a duplexer 106, a matching inductor 114, and a low noise amplifier 110. For example, a low-band module with ten duplexers 106 and ten low noise amplifiers 110 includes ten matching inductors 114. In highly compact module design, conserving space and reducing costs are important. Disadvantageously, the matching inductors 114 occupy a lot of space and increase the cost of the multi-band radio frequency device 100.

Referring to FIG. 1, for receive radio frequency signals, the LNA switch 108 is switched to provide a signal path between the selected duplexer 106 and the corresponding low noise amplifier 110 that is associated with the frequency band that includes the received radio frequency signal from the at least one antenna 102. The selected low noise amplifier 110 receives the received radio frequency signal from the receiver node of the selected duplexer 106 via the LNA switch 108. The baseband system (not illustrated) provides control signals to the LNA switch 108 to control the switching such that the received radio frequency signal from the selected duplexer is routed to the selected low noise amplifier 110.

Each low noise amplifier 110 provides amplification for the received radio frequency signal. Each low noise amplifier 110 is in communication with the receiver (not illustrated) of the multi-band radio frequency device 100 and provides the amplified signal to the receiver for further processing.

Figure 2:
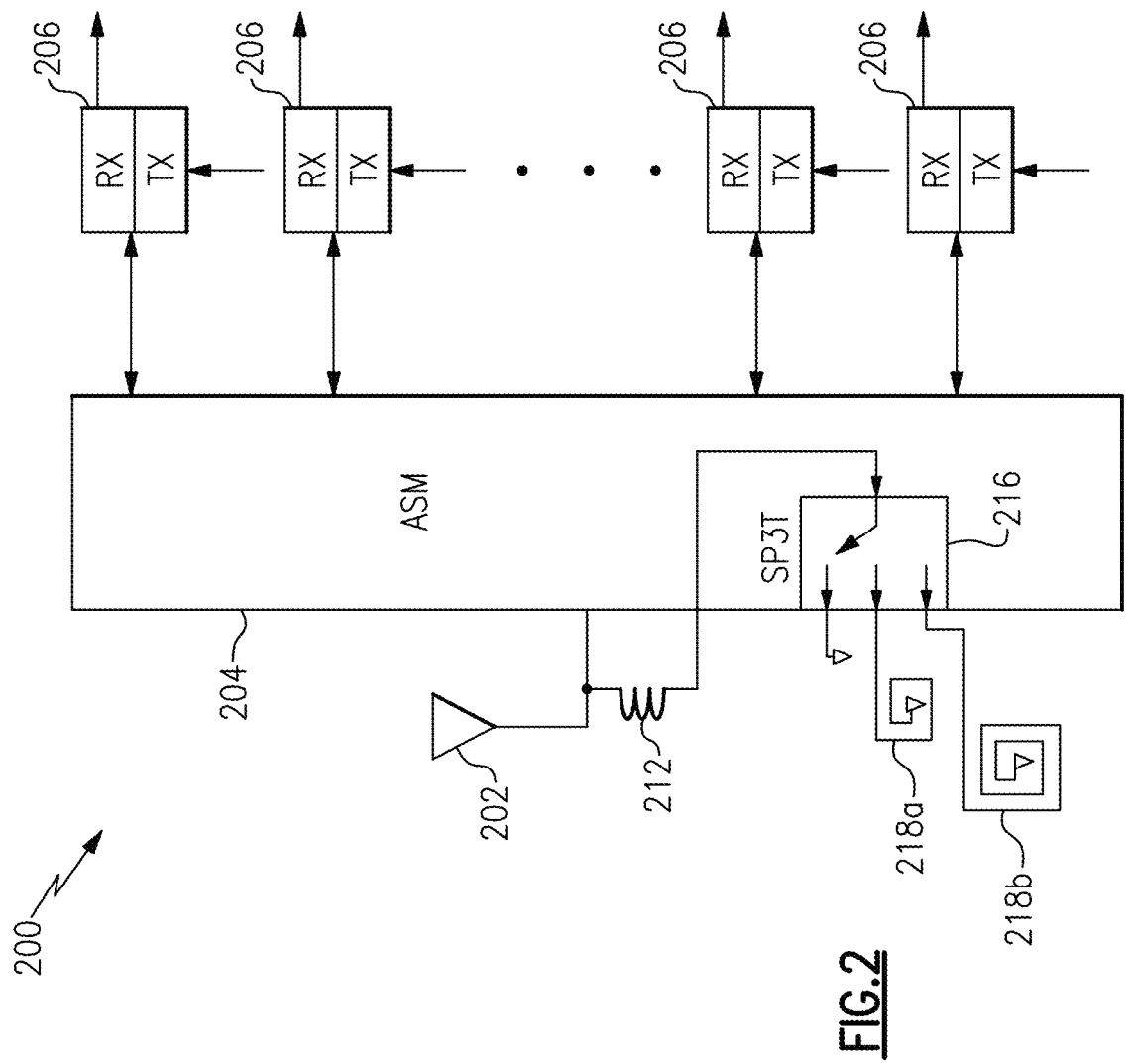
FIG. 2 is a schematic diagram of one example of a multi-band radio frequency device having a single shunt inductor with tuning capability to operate multiple duplexers.

FIG. 2 is a schematic diagram of one example of a multi-band radio frequency device 200 having a single shunt inductor with tuning capability to operate multiple duplexers. The illustrated radio frequency device 200 comprises at least one antenna 202, an antenna switching module 204, a plurality of duplexers 206, a tuning inductor 212, and a switch 216 that can add additional inductance into the tuning circuitry. Each duplexer 206 can operate at a different frequency band, as described above with respect to FIG. 1. Tuning inductor 212 and switch 216 replace the plurality of tuning inductors 112. The inductors in communication with the switch 216 can be switched into or out of the tuning circuitry to tune the total inductor value individually for each frequency band. Advantageously, replacing the plurality of tuning inductors 112 with a single tuning inductor 212 reduces the space requirements and cost of the tuning circuitry for the multi-band radio frequency device 200 when compared to the space requirements and cost of the tuning circuitry for the multi-band radio frequency device 100.

In an aspect, a first end of tuning inductor 212 is connected to the signal path between the at least one antenna 202 and the selected duplexer 206 of the plurality of duplexers 206 via the antenna switching module 204. A second end of the tuning inductor 212 is connected to ground via the switch 216. As illustrated in FIG. 2, switch 216 can be a single pole triple throw switch. The pole is connected to the first end of the inductor 212. The first throw is connected to ground. The second throw is connected to the first end of inductor 218a. A second end of inductor 218a is connected to ground. The third throw is connected to a first end of inductor 218b. A second end of inductor 218b is connected to ground. The switch 216 and inductors 218a, 218b can be used to provide additional inductance for the tuning circuitry. For example, the inductance values used to tune the signal characteristics may be different for the circuitry associated with the different frequency bands. Each pole of the switch 216 can be associated with a different tuning range where the inductors in communication with the poles have different values. In other aspects, switch 216 can have more or less than three throws, where each throw is connected to an inductor having a different value to increase the tuning range. In other aspect, the switch 216 can have more than one pole to increase the tuning range. In another aspect, the switch 216 and inductors 218a, 218b can be implemented as embedded traces on a multi-layer circuit board or pack (PCP) of a multi-chip module (MCM). For example, embedded inductors can be implemented as traces within a multi-layer circuit board.

In an aspect, tuning inductor 212 can be a surface mount device. In another aspect, inductor 212 can be replaced with two high Q inductors configured in parallel for a higher Q and reduced inductor variation. In another aspect, the two high Q inductors can be surface mount devices.

Figure 3:
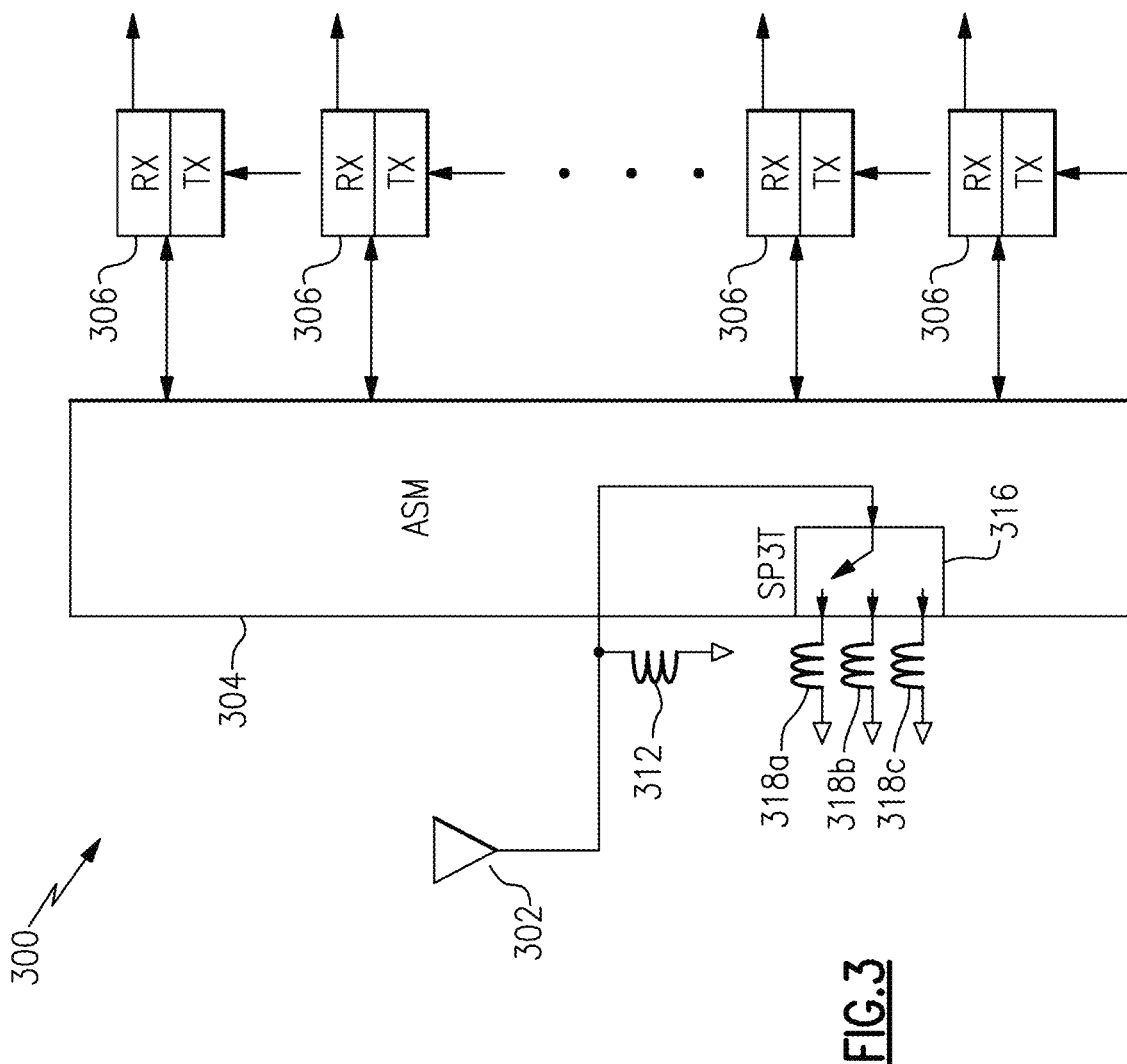
FIG. 3 is a schematic diagram of another example of a multi-band radio frequency device having a single shunt inductor with tuning capability to operate multiple duplexers.

FIG. 3 is a schematic diagram of another example of a multi-band radio frequency device 300 having a single shunt inductor with tuning capability to operate multiple duplexers. The illustrated radio frequency device 300 comprises at least one antenna 302, an antenna switching module 304, a plurality of duplexers 306, a tuning inductor 312, and a switch 316 that can add additional inductance into the tuning circuitry. Each duplexer 306 can operate at a different frequency band, as described above with respect to FIG. 1. Tuning inductor 312 and switch 316 replace the plurality of tuning inductors 112. The inductors in communication with the switch 316 can be switched into or out of the tuning circuitry to tune the total inductor value individually for each frequency band. Advantageously, replacing the plurality of tuning inductors 112 with a single tuning inductor 312 reduces the space requirements and cost of the tuning circuitry for the multi-band radio frequency device 300 when compared to the space requirements and cost of the tuning circuitry for the multi-band radio frequency device 100.

FIG. 3 is similar to FIG. 2. In an aspect, a first end of tuning inductor 312 is connected to the signal path between the at least one antenna 302 and the selected duplexer 306 via the antenna switching module 304. A second end of the tuning inductor 312 is connected to ground via the switch 316. As illustrated in FIG. 3, switch 316 can be a single pole triple throw switch. The pole is connected to the first end on tuning inductor 312. The first throw is connected to a first end of inductor 318a and a second end of inductor 318a is connected to ground. The second throw is connected to a first end of inductor 318b and a second end of inductor 318b is connected to ground. The third throw is connected to a first end of inductor 318c and a second end of inductor 318c is connected to ground. The switch 316 and inductors 318a, 318b, 318c can be used to provide additional inductance for the tuning circuitry. For example, the inductance values used to tune the signal characteristics may be different for the circuitry associated with the different frequency bands. Each pole of the switch 316 can be associated with a different tuning range where the inductors in communication with the poles have different values. In other aspects, switch 316 can have more than three throws, where each throw is connected to an inductor having a different value to increase the tuning range. In other aspect, the switch 316 can have more than one pole to increase the tuning range. In another aspect, inductors 318a, 318b, 318c can be surface mount devices.

The single tuning inductor 212, 312 and additional switch 216, 316 are used to tune the duplexer/antenna signal path in order for each frequency band to function properly. The advantages of the single tuning inductor multi-band radio frequency devices 200, 300 over previous solutions of a dedicated tuning inductor 112 for the circuitry associated with each frequency band are at least:

1) A dedicated antenna shunt inductor is not needed for each duplexer;
2) Because fewer parts are used, there is a cost savings;
3) Because fewer parts are used, there is a space savings for the printed circuit boards and modules associated with the multi-band radio frequency devices;
4) To reduce surface mount component variation in manufacturing and to provide a higher Q (quality factor), two parallel high Q inductors can be substituted for the single tuning inductor;
5) Switches 216, 316 can have additional throws and associated small inductors to increase the tuning range; and
6) The duplexers do not need to be redesigned.

Figure 4:
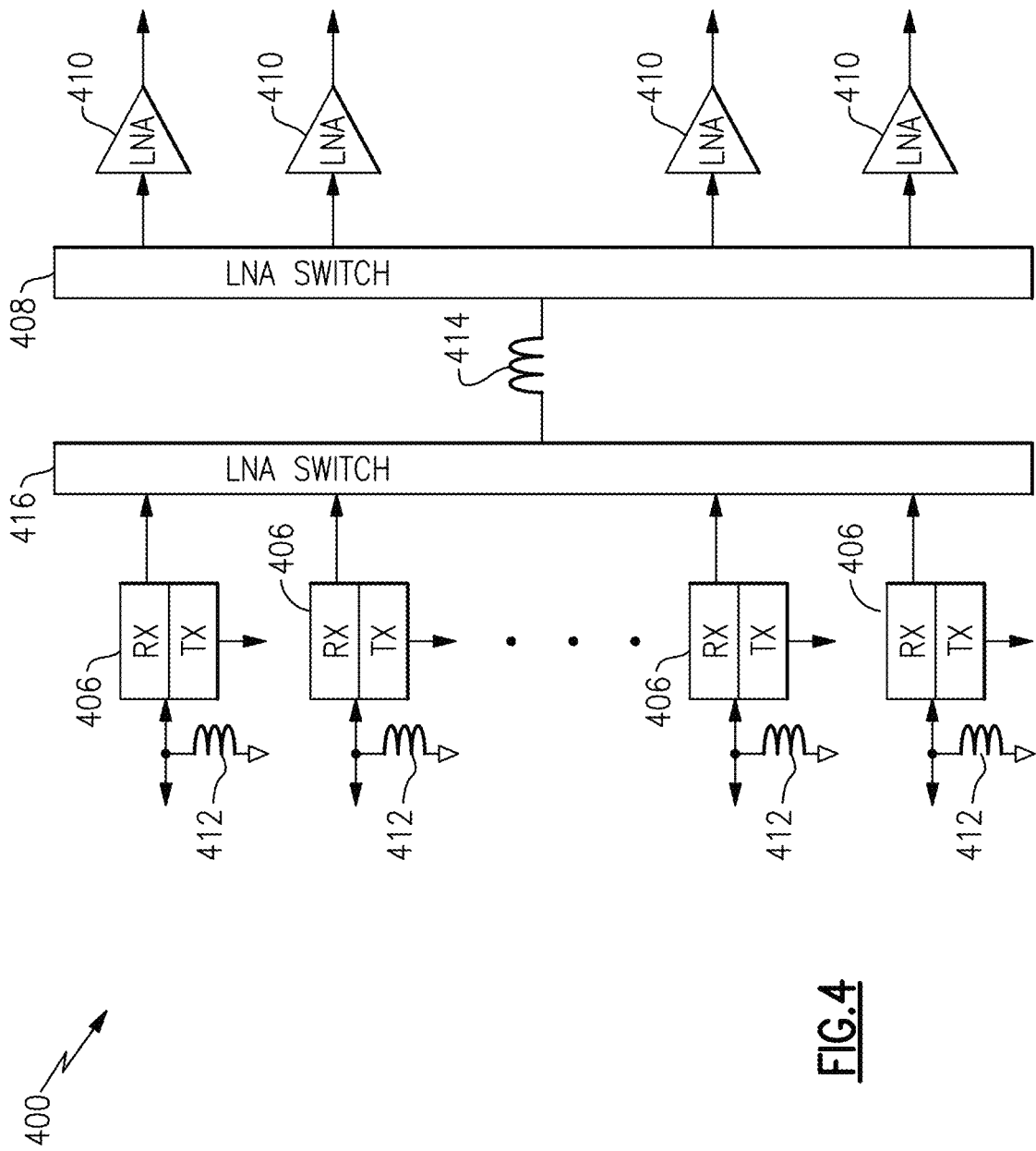
FIG. 4 is a schematic diagram of one example of a multi-band radio frequency device having a single impedance matching inductor and dedicated low noise amplifiers.

FIG. 4 is a schematic diagram of one example of a multi-band radio frequency device 400 having a single impedance matching inductor and dedicated low noise amplifiers. The illustrated multi-band radio frequency device 400 comprises a plurality of duplexers 406, where each duplexer 406 is associated with a tuning inductor 412. Each duplexer 406 can operate at a different frequency band, as described above with respect to FIG. 1. The plurality of duplexers 406 and the plurality of tuning inductors 412 can correspond to the plurality of duplexers 106 and the plurality of tuning inductors 112 illustrated in FIG. 1. In other configurations, the plurality of tuning inductors 412 can be replaced with a single tuning inductor 212 or 312 and switch 216 or 316 as illustrated in FIGS. 2 and 3, respectively. The multi-band radio frequency device 400 further comprises a first LNA switch 408 and a plurality of low noise amplifiers 410. Each low noise amplifier 410 is dedicated to a specific frequency band associated with the multi-band radio frequency device 400. The first LNA switch 408 and the plurality of low noise amplifiers 410 can correspond to the LNA switch 108 and the plurality of low noise amplifiers 110 illustrated in FIG. 1.

The multi-band radio frequency device 400 further comprises a second LNA switch 416 and a single matching inductor 414. The second LNA switch 416 and the single matching inductor 414 can replace the plurality of matching inductors 114 illustrated in FIG. 1. Advantageously, replacing the plurality of matching inductors 114 with the single matching inductor 414 and the second LNA switch 416 reduces the space requirements and cost of the circuitry for the multi-band radio frequency device 400 when compared to the space requirements and cost of the impedance matching circuitry for the multi-band radio frequency device 100.

In an aspect, the selected duplexer 406 receives the received radio frequency signal via the antenna switching module (not illustrated in FIG. 4). The received radio frequency signal is output at the receive node of the selected duplexer 406 and passes through the single impedance matching inductor 414 to the selected low noise amplifier 410 for amplification and transmission to the receiver of the multi-band radio frequency device 400. The baseband system (not illustrated) provides control signals to the LNA switches 408, 416 to control the switching such that the received radio frequency signal from the selected duplexer 406 is routed to the selected low noise amplifier 410 through the single impedance matching inductor 414. When the LNA switches 408, 416 are switched to provide a signal path between the selected duplexer 406 and the associated selected low noise amplifier 410, the single impedance matching inductor 414 is in series with the receive node of the selected duplexer 406 and the input node of the selected low noise amplifier 410. In an aspect, the matching inductor 414 is a surface mount device.

Figure 5:
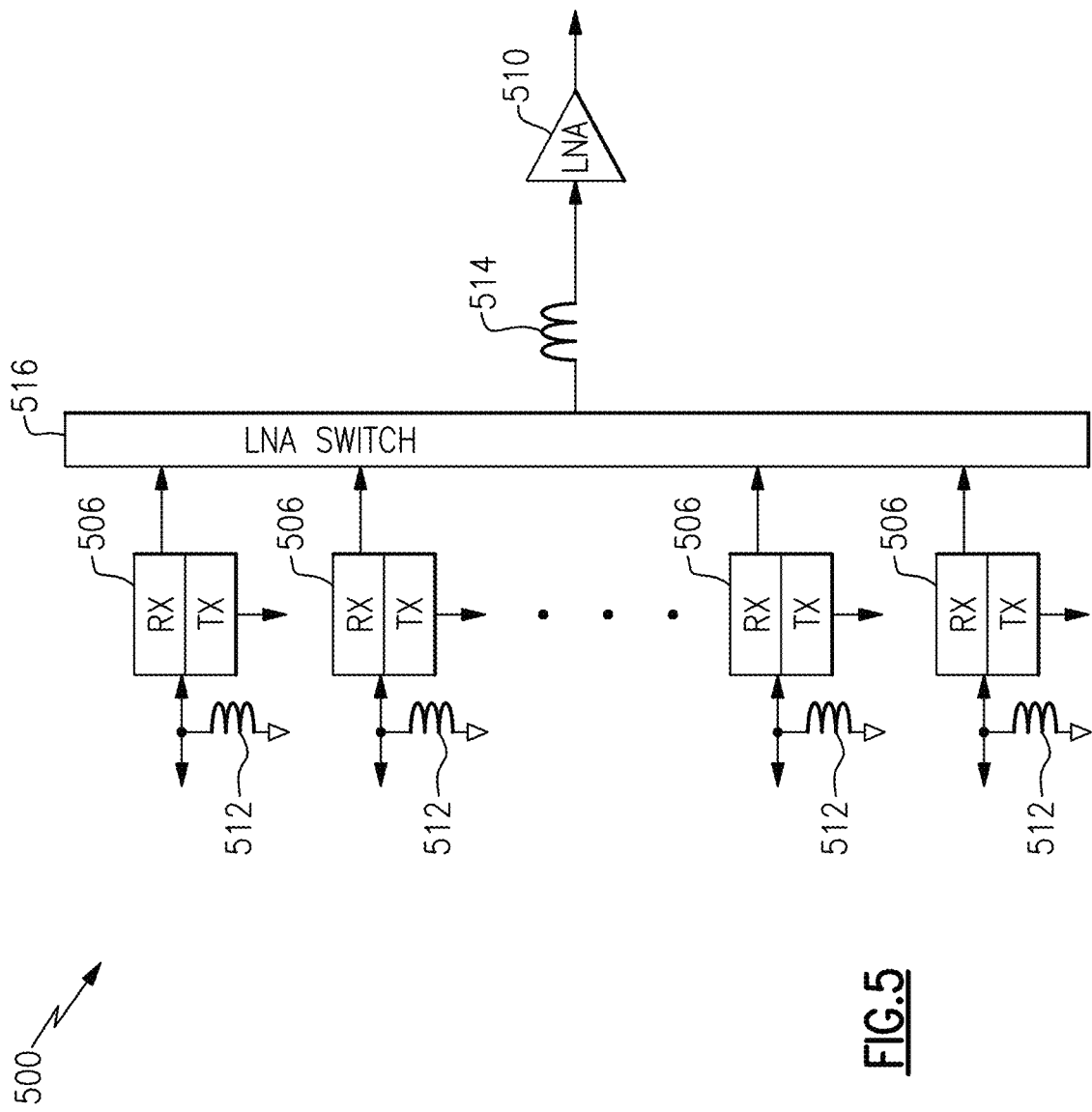
FIG. 5 is a schematic diagram of one example of a multi-band radio frequency device having a single impedance matching inductor and a shared low noise amplifier.

FIG. 5 is a schematic diagram of one example of a multi-band radio frequency device 500 having a single series inductor and a shared low noise amplifier. The illustrated multi-band radio frequency device 500 comprises a plurality of duplexers 506, where each duplexer 506 is associated with a tuning inductor 512. Each duplexer 506 can operate at a different frequency band, as described above with respect to FIG. 1. The plurality of duplexers 506 and the plurality of tuning inductors 512 can correspond to the plurality of duplexers 106 and the plurality of tuning inductors 112 illustrated in FIG. 1. In other configurations, the plurality of tuning inductors 512 can be replaced with a single tuning inductor 212 or 312 and switch 216 or 316 as illustrated in FIGS. 2 and 3, respectively. The multi-band radio frequency device 500 further comprises a LNA switch 516, a single impedance matching inductor 514, and a shared low noise amplifier 510. The shared low noise amplifier 510 amplifies the received radio frequency signal for more than one frequency band of the multi-band radio frequency device 500.

The LNA switch 516 and the single matching inductor 514 can replace the plurality of matching inductors 114 and LNA switch 108 illustrated in FIG. 1. Advantageously, replacing the plurality of matching inductors 114 with a single matching inductor 514 reduces the space requirements and cost of the circuitry for the multi-band radio frequency device 500 when compared to the space requirements and cost of the impedance matching circuitry for the multi-band radio frequency device 100.

In an aspect, the selected duplexer 506 receives the received radio frequency signal via the antenna switching module (not illustrated in FIG. 5). The received radio frequency signal is output at the receive node of the selected duplexer 506 and passes through the single impedance matching inductor 514 via the LNA switch 516 to the shared low noise amplifier 510 for amplification and transmission to the receiver of the multi-band radio frequency device 500. The baseband system (not illustrated) provides control signals to switch the LNA switch 516 to control the switching such that the received radio frequency signal from the selected duplexer 506 is routed to the shared low noise amplifier 510 through the single impedance matching inductor 514. When the LNA switch 516 is switched to provide a signal path between the selected duplexer 506 and the shared low noise amplifier 510, the single impedance matching inductor 514 is in series with the receive node of the selected duplexer 506 and the input node of the shared low noise amplifier 510. In an aspect, the matching inductor 514 is a surface mount device.

FIGS. 6-9 are noise figure plots of receiver ending impedances for various frequency bands. The calculations involve simulating the low noise amplifier and its associated noise characteristics and plotting the noise figure for different impedances for various frequency bands. Each plot includes the minimum amplifier noise for the simulated low noise amplifier, and four noise circles, associated with the noise factor, that surround the minimum amplifier noise. In FIGS. 6-9, the first noise circle is at approximately 0.50 dB from the minimum amplifier noise, the second noise circle is at approximately 0.60 dB from the minimum amplifier noise and is the target noise circle, the third noise circle is at approximately 0.70 dB from the minimum amplifier noise, and the fourth noise circle is at approximately 0.80 dB from the minimum amplifier noise. Ideally, all receiver ending impedances, measured after the matching inductor 414 or 514 would fall inside the target noise circle.

Figure 6B:
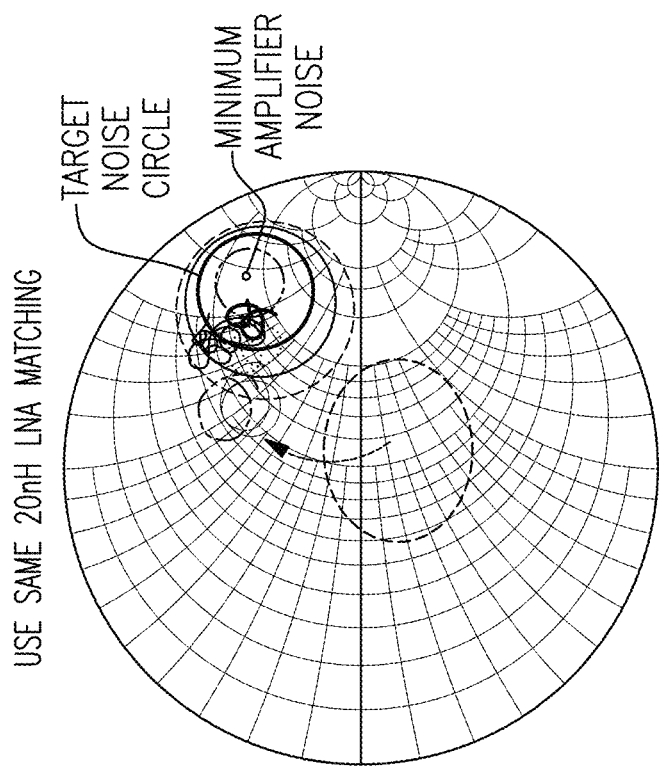
FIG. 6B is one example of a plot illustrating the impedances associated with a multi-band radio frequency device after adding LNA matching impedance for each band.
Figure 6A:
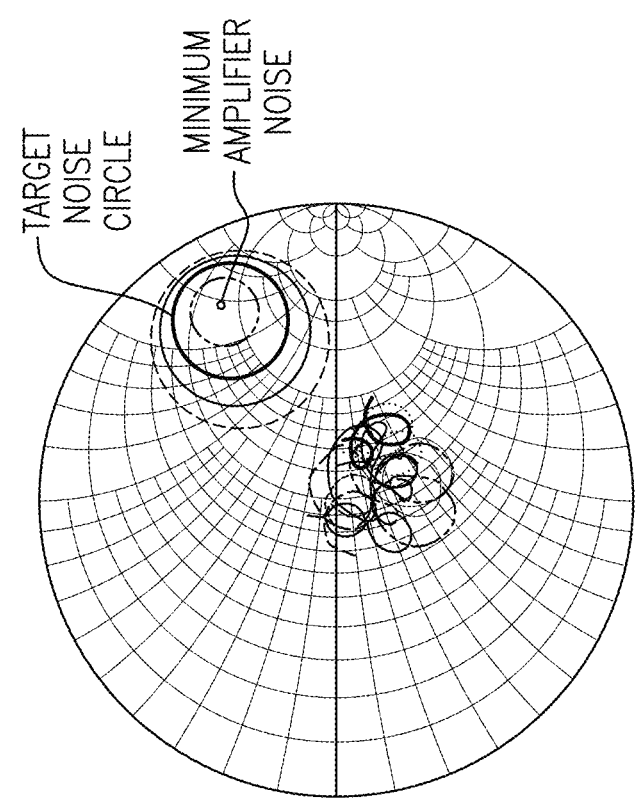
FIG. 6A is one example of a plot illustrating the impedances associated with a multi-band radio frequency device before adding a LNA matching impedance for each frequency band.

FIGS. 6A and 6B are examples of plots illustrating the impedances associated with the receivers of a ten band multi-band radio frequency device. In the illustrated plots, the bands are approximately 1) 925.0 MHz to 960.0 MHz; 2) 729.0 MHz to 746.0 MHz; 3) 746.0 MHz to 756.0 MHz; 4) 758.0 MHz to 768.0 MHz; 5) 791.0 MHz to 821.0 MHz; 6) 859.0 MHz to 894.0 MHz; 7) 758.0 MHz to 788.0 MHz; 8) 773.0 MHz to 803.0 MHz; 9) 617.0 MHz to 642.0 MHz; and 10) 627.0 MHz to 652.0 MHz. FIG. 6A illustrates impedances associated with the receive signal path of the ten band multi-band radio frequency device before adding a LNA matching impedance for each band. The impedances are not aligned or centered. FIG. 6B illustrates impedances associated with the receive signal path of the ten band multi-band radio frequency device where the matching inductor for each frequency band is approximately the same value. In the illustrated example, the LNA matching inductor for each frequency band is approximately 20 nH. The matching inductor has rotated the impedances from their initial position. Because the impedance rotation is related to the equation $j\omega L$, where L is the inductor value, $\omega=2\pi f$, and f is the frequency, a lower frequency band will have a lower rotation than a higher frequency band. These results indicate that when multiple frequency bands use matching inductors that have the same value, all of impedances do not fall within the target LNA noise circle. To improve the receive path performance, in one aspect, a dedicated and different value impedance matching inductor can be used for each band. For example, the impedance of each receive path is aligned with the real impedance of the low noise amplifier. As illustrated in FIG. 1, one matching inductor 114 that is aligned with the real impedance of the associated low noise amplifier 110 is used for each frequency band and the value of the each matching inductor 114 is dependent upon the specific frequency band associated with each receiver.

FIG. 7 is an example of a plot illustrating the impedances associated with the receive signal path of a ten band multi-band radio frequency device. In the illustrated plots, the bands are approximately 1) 925.0 MHz to 960.0 MHz; 2) 729.0 MHz to 746.0 MHz; 3) 746.0 MHz to 756.0 MHz; 4) 758.0 MHz to 768.0 MHz; 5) 791.0 MHz to 821.0 MHz; 6) 859.0 MHz to 894.0 MHz; 7) 758.0 MHz to 788.0 MHz; 8) 773.0 MHz to 803.0 MHz; 9) 617.0 MHz to 642.0 MHz; and 10) 627.0 MHz to 652.0 MHz. FIG. 7 illustrates impedances associated with the receive signal paths of the ten band multi-band radio frequency device that uses a single inductor to rotate the impedances for all of the frequency bands inside the target noise circle. Examples of this circuit implementation are illustrated in FIGS. 4 and 5. Ideally, all receive signal ending impedances, measured after the matching inductor 414 or 514 would fall inside the target noise circle.

Figure 8B:
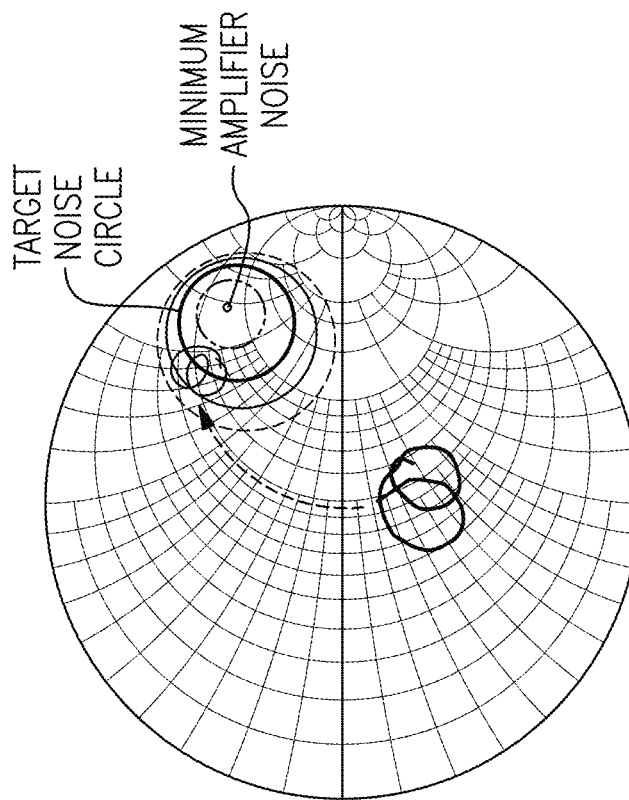
FIGS. 8A and 8B are examples of plots illustrating differing impedance values to rotate receiver impedances of different frequency bands.
Figure 8A:
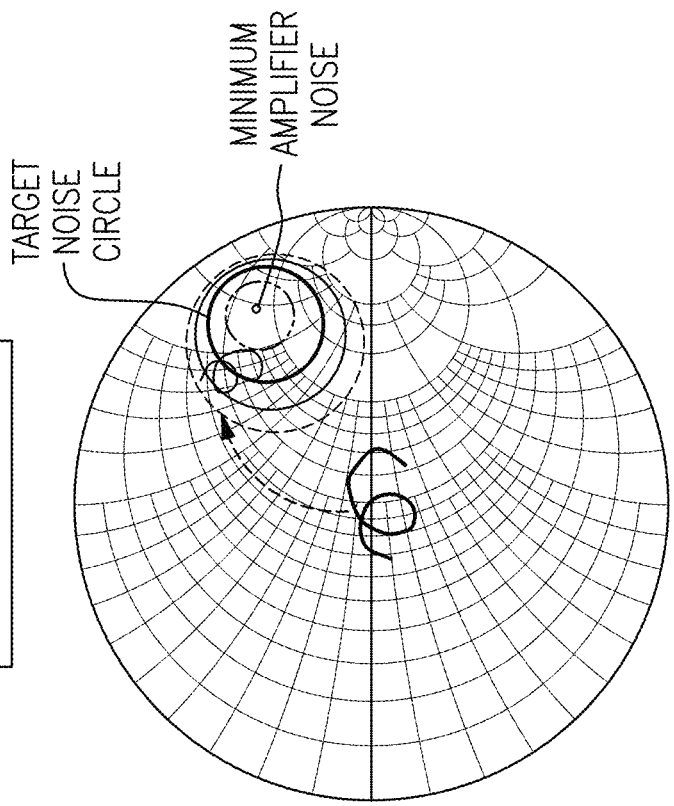
Figure 9:
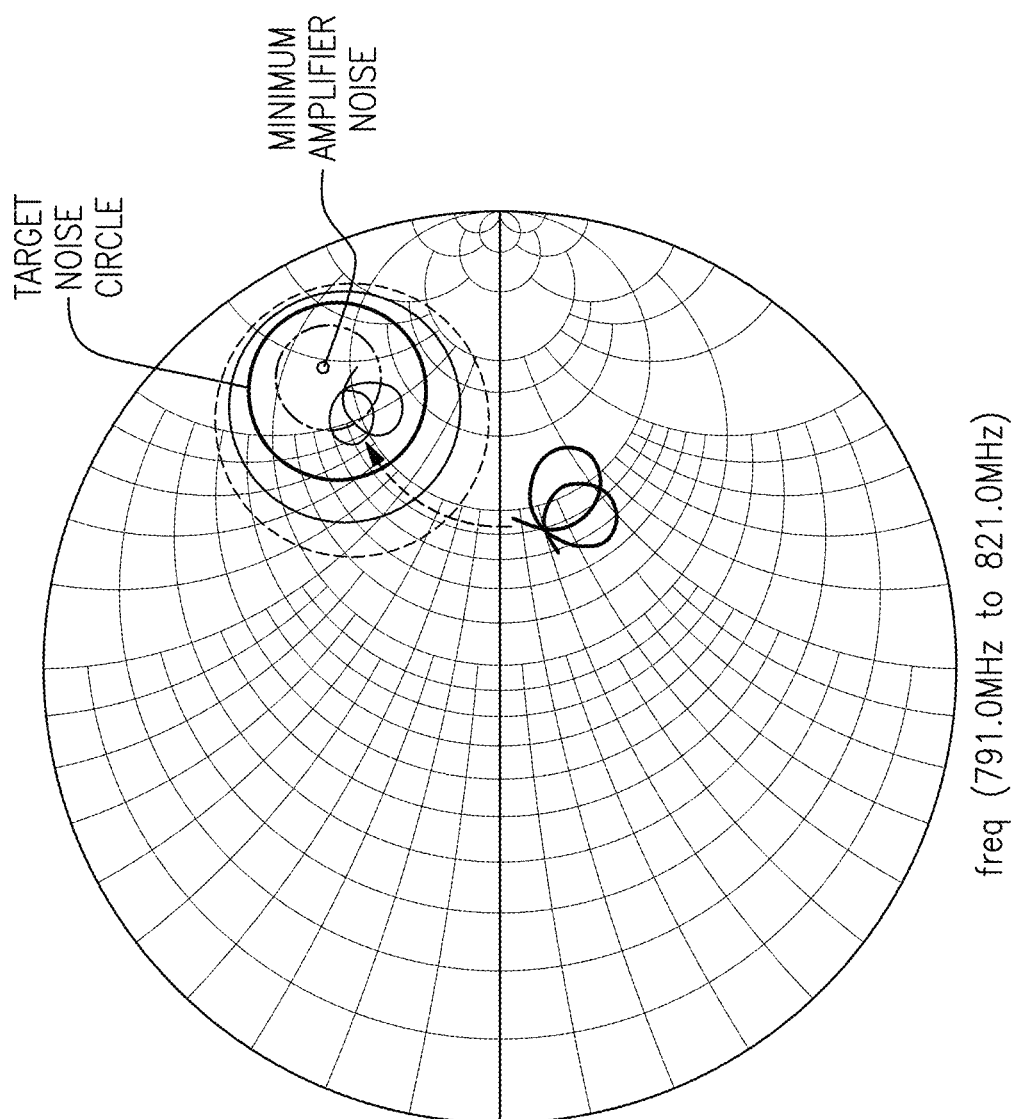
FIG. 9 is one example of a plot illustrating the rotation of the impedance within the target noise circle.

FIGS. 8A and 8B are examples of plots illustrating that different inductances can be used to rotate the impedance inside of the target noise circle for different frequency bands. FIG. 8A is an example plot illustrating the impedance of the receive signal path for the B12 frequency band (approximately 729.0 MHz to 746.0 MHz) before and after rotation. Using a matching inductor of approximately 20 nH rotates the impedance into the target noise circle. FIG. 8B is an example plot illustrating the impedance of the receive signal path for the B71 frequency band (approximately 617.0 MHz to 642.0 MHz) before and after rotation. Using a matching inductor of approximately 30 nH rotates the impedance into the target noise circle. FIG. 9 is another example of a plot illustrating the rotation of the impedance within the target noise circle using embodiments of the circuitry illustrated in FIGS. 4 and 5. The starting impedance of the receiver without a matching inductor is shown below the noise circle. The impedance is rotated using a fixed inductor value. The ending impedance lies within the target noise circle. Because the impedance rotation is frequency dependent, as described above, the impedance for a lower frequency band may have less capacitance while the impedance for a higher frequency band may have more capacitance.

In an aspect, in addition to using a single impedance matching inductor for each receive signal path to operate frequency bands in multi-band radio frequency device, the receiver filter in each receiver can be designed such that the ending impedance for each frequency band's lies within the target noise circle. The receiver design can accommodate the different impedance values, as illustrated in FIGS. 8A and 8B, used to rotate the receive signal path impedance into the target noise circle. This typically does not use additional components in the design of the receiver filter or other circuitry. Each receiver can have a different filter to adjust for the differences in rotation due to the differences in the frequency bands. FIG. 6B illustrates the receiver impedances using a single 20 nH inductor to match the receiver impedances without adjusting the receiver filter to finely tune the impedance. Much of the rotated impedances are outside of the target noise circle. FIG. 7 illustrates the receiver impedances using a single 20 nH inductor to match the receiver impedances and the receiver filters have been adjusted to finely tune the impedance. Using this approach, the receiver impedances are rotated within the target noise circle.

The advantages to the single matching inductor for multiple frequency bands for multi-band radio frequency devices 400, 500 over previous solutions of a) no matching inductor and b) a dedicated matching inductor for the circuitry associated with each frequency band are at least:
1) A LNA matching component is not needed for each frequency band;
2) Because fewer parts are used, there is a cost savings;
3) Because fewer parts are used, there is a space savings for the printed circuit boards and modules associated with the multi-band radio frequency devices; and
4) Embodiments of the multi-band radio frequency device 400, 500 illustrated in FIGS. 4 and 5 can apply to different low noise amplifier architectures, such as a shared low noise amplifier that is shared by several bands or a dedicated low noise amplifier for each frequency band.

Figure 10:
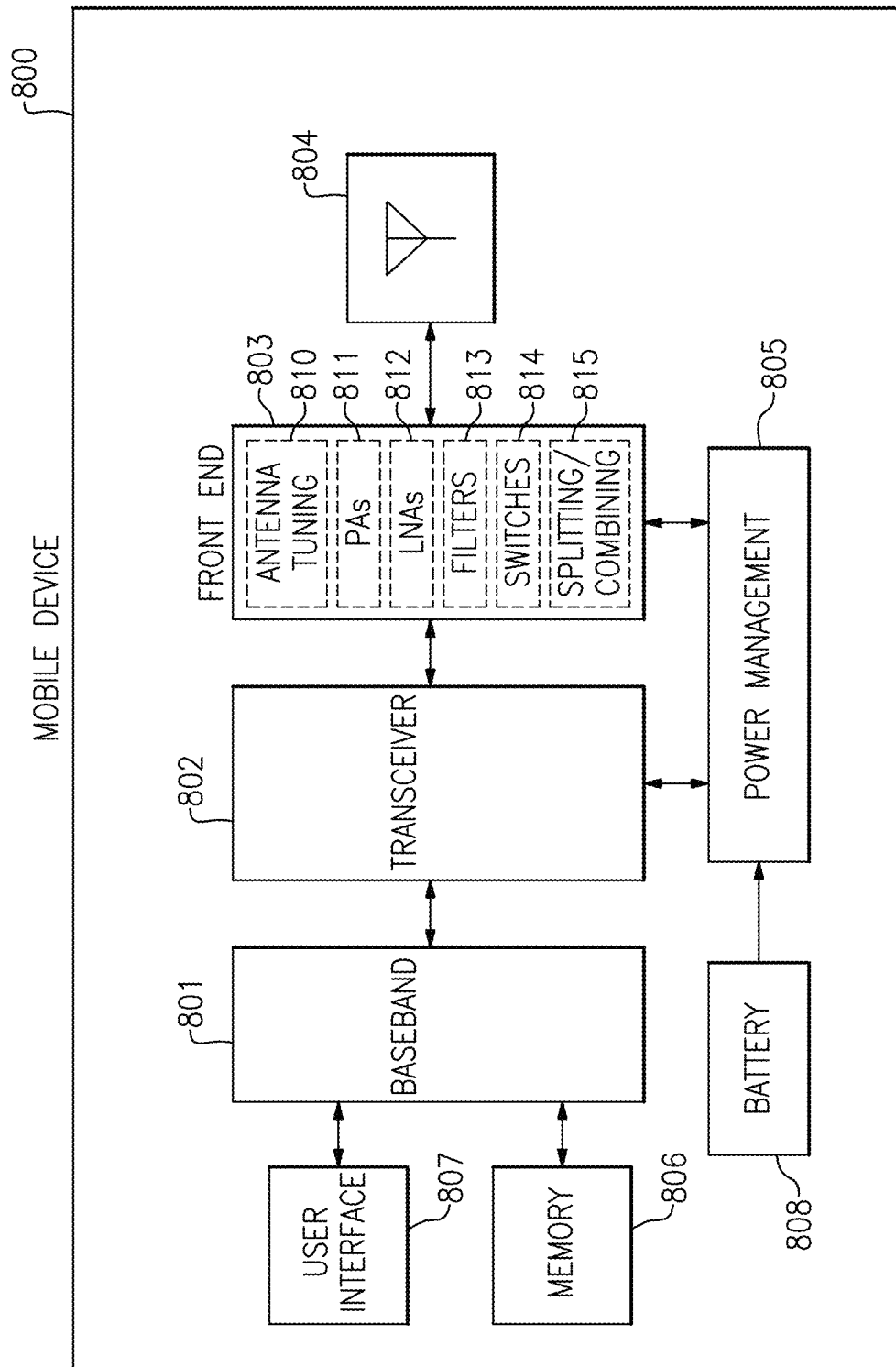
FIG. 10 is a schematic diagram of one embodiment of a mobile device.

FIG. 10 is a schematic diagram of one embodiment of a mobile device 800. The mobile device 800 includes a baseband system 801, a transceiver 802, a front end system 803, antennas 804, a power management system 805, a memory 806, a user interface 807, and a battery 808. The mobile device 800 can be implemented in accordance with any of the embodiments herein.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 10 as the transceiver 802. In one example, separate components (for instance, separate circuits or dies) can be provided for handling certain types of RF signals.

The front end system 803 aids in conditioning signals transmitted to and/or received from the antennas 804. In the illustrated embodiment, the front end system 803 includes antenna tuning circuitry 810, power amplifiers (PAs) 811, low noise amplifiers (LNAs) 812, filters 813, switches 814, and signal splitting/combining circuitry 815. However, other implementations are possible.

For example, the front end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 10, the baseband system 801 is coupled to the memory 806 to facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 10, the power management system 805 receives a battery voltage from the battery 808. The battery 808 can be any suitable battery for use in the mobile device 800, including, for example, a lithium-ion battery.

Figure 11:
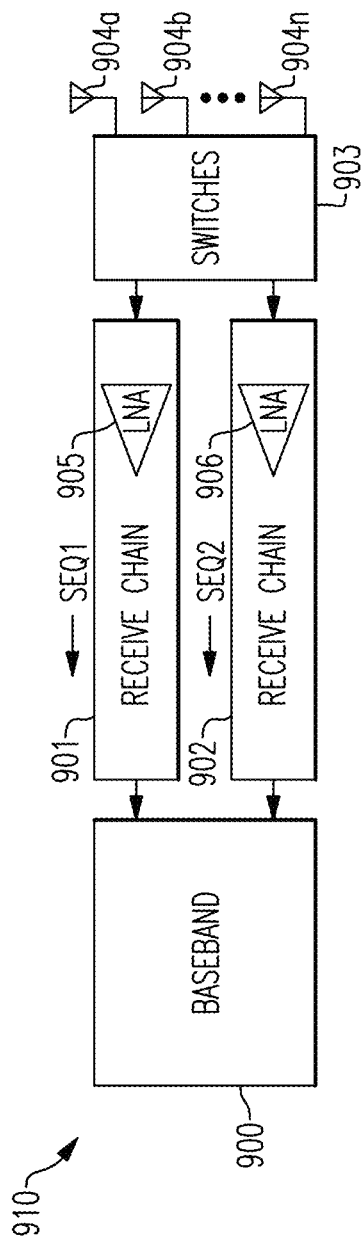
FIG. 11 is a schematic diagram of one embodiment of an RF communication system.

FIG. 11 is a schematic diagram of one embodiment of an RF communication system 910. The RF communication system 910 includes a baseband system 900, a first receive chain 901, a second receive chain 902, switches 903, and antennas 904a, 904b, . . . 904n. The RF communication system 910 represents a wireless device of a cellular network, such as a mobile phone. The RF communication system 910 can be implemented in accordance with any of the embodiments herein.

With continuing reference to FIG. 11, the first receive chain 901 includes a first low noise amplifier 905, and the second receive chain 902 includes a second low noise amplifier 906. The first low noise amplifier 905 is used to amplify a first RF receive signal. Additionally, the second low noise amplifier 906 is used to amplify a second RF receive signal.

As shown in FIG. 11, the switches 903 are used to selectively connect the first low noise amplifier 905 and the second low noise amplifier 906 to desired antenna(s) chosen from the antennas 904a, 904b, . . . 904n. Although the RF communication system 910 is depicted as including three antennas, more or fewer antennas can be included as indicated by the ellipses.

The baseband system 900 controls generation of the command that generates the control signals to control the switches 903 and switches in the first and second receive chains 901, 902, such as switches 216, 316, 408, 416, and 516. The RF communication system 910 can be implemented using a single tuning inductor for the antenna switching module to operate multiple frequency bands in the multi-band radio frequency device 200, 300, 400, 500, according to the teachings herein. Further, the RF communication system 910 can be implemented using a single matching inductor for the receiver signal path to operate multiple frequency bands in the multi-band radio frequency device 200, 300, 400, 500 according to the teachings herein.

Figure 12:
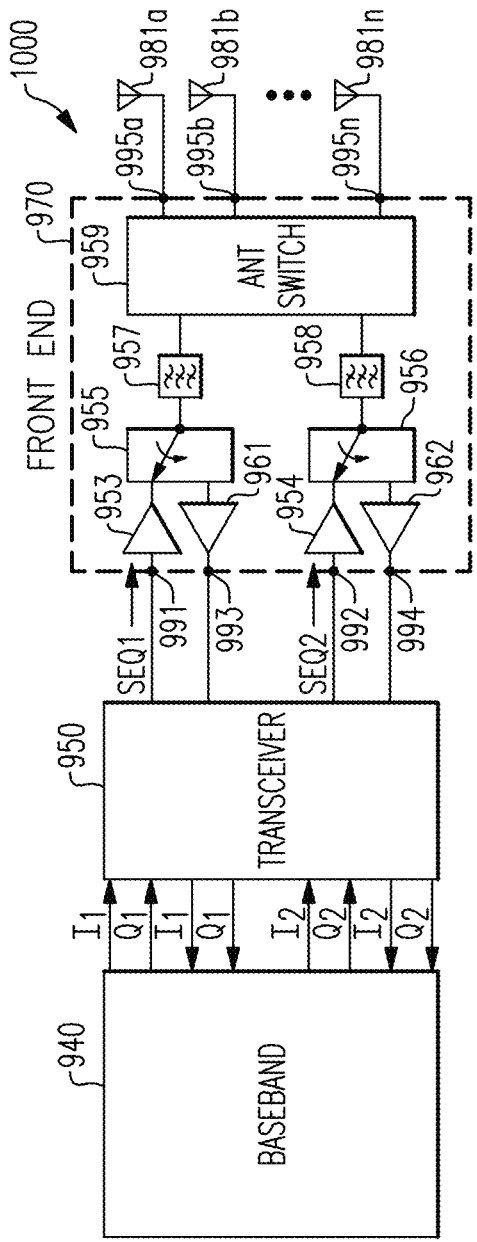
FIG. 12 is a schematic diagram of another embodiment of an RF communication system.

FIG. 12 is a schematic diagram of another embodiment of an RF communication system 1000. The RF communication system 1000 includes a baseband system 940, a transceiver 950, a front end system 970, and antennas 981a, 981b, . . . 981n. The RF communication system 1000 represents a wireless device of a cellular network, such as a mobile phone. The RF communication system 1000 can be implemented in accordance with any of the embodiments herein.

As shown in FIG. 12, the baseband system 940 generates a first pair of in-phase (I) and quadrature-phase (Q) signals representing a first transmit signal. Additionally, the baseband system 940 processes a first pair of I and Q signals representing a first receive signal. Furthermore, the baseband system 940 generates a second pair of I and Q signals representing a second transmit signal. Additionally, the baseband system 940 processes a second pair of I and Q signals representing a second receive signal.

With continuing reference to FIG. 12, the transceiver 950 modulates the first pair of I and Q signals representing the first transmit signal to generate a first RF transmit signal provided to the front end system 970 at a first transmit terminal 991. The first RF transmit signal carries a first sequence of symbols (SEQ1). Additionally, the transceiver 950 demodulates a first RF receive signal from a first receive terminal 993 of the front end system 970 to generate the first pair of I and Q signals representing the first receive signal. Furthermore, the transceiver 950 modulates the second pair of I and Q signals representing the second transmit signal to generate a second RF transmit signal provided to the front end system 970 at a second transmit terminal 992. The second RF transmit signal carriers a second sequence of symbols (SEQ2). Additionally, the transceiver 970 demodulates a second RF receive signal from a second receive terminal 994 of the front end system 970 to generate the second pair of I and Q signals representing the second receive signal.

As shown in FIG. 12, the front end system 970 includes a first power amplifier 953, a second power amplifier 954, a first transmit/receive switch 955, a second transmit/receive switch 956, a first band filter 957, a second band filter 958, an antenna switch 959, a first low noise amplifier 961, and a second low noise amplifier 962.

Although one embodiment of a front end system 970 is shown, other implementations of front end systems are possible. For example, a wide range of components and circuitry can be present between an output of a power amplifier and an antenna. Examples of such components and circuitry include, but are not limited to, switches, matching networks, harmonic termination circuits, filters, resonators, duplexers, detectors, directional couplers, bias circuitry, and/or frequency multiplexers (for instance, diplexers, triplexers, etc.). Furthermore, multiple instantiations of one or more components or circuits can be included. Moreover, a wide range of components and circuitry can be present between the transceiver and an input to a power amplifier.

As shown in FIG. 12, the antenna switch 959 is used to selectively connect the first power amplifier 953 and the second power amplifier 954 to desired antenna(s) chosen from the antennas 981a, 981b, . . . 981n, when in the transmit mode. When in the receive mode, (not illustrated) the antenna switch 959 is used to selectively connect the first low noise amplifier 961 and the second low noise amplifier 962 to desired antenna(s) chosen from the antennas 981a, 981b, . . . 981n. The front end system 970 is coupled to the antennas 981*a*, 981*b*, . . . 981*n* at antenna terminals 995*a*, 995*b*, . . . 995*n*, respectively. Although the RF communication system 1000 is depicted as included three antennas, more or fewer antennas can be included as indicated by the ellipses.

In the illustrated embodiment, the RF communication system 1000 includes a first transmit path through the first power amplifier 953 and a second transmit path through the second power amplifier 954. The RF communication system 1000 further includes a first receive path through the first low noise amplifier 961 and a second receive path through the second low noise amplifier 962.

The baseband system 940 control generation of the command that generates the control signals to control the switches 955, 956, which may correspond to switches 216, 316, 408, 416, and 516. The RF communication system 1000 can be implemented using a single tuning inductor for the antenna switching module to operate multiple frequency bands in the multi-band radio frequency device 200, 300, 400, 500, according to the teachings herein. Further, the RF communication system 1000 can be implemented using a single matching inductor in the receive signal path to operate multiple frequency bands in the multi-band radio frequency device 200, 300, 400, 500 according to the teachings herein.

Applications

Some of the embodiments described above have provided examples in connection with mobile devices. However, the principles and advantages of the embodiments can be used for a wide range of RF communication systems. Examples of such RF communication systems include, but are not limited to, mobile phones, tablets, base stations, network access points, customer-premises equipment (CPE), laptops, and wearable electronics.

Terminology

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A front end module comprising:
a plurality of duplexers, each duplexer configured to transmit and receive radio frequency signals within a specific frequency band of a plurality of frequency bands;
an antenna switch in communication with an antenna and having a plurality of switch positions, the antenna switch configured to provide communication, responsive to a control signal, between the antenna and a selected duplexer of the plurality of duplexers;
a single tuning inductor configured to provide tuning for the antenna switch for each of the plurality of switch positions;
a tuning switch having a pole and a plurality of throws, the single tuning inductor having a second end in communication with the pole of the tuning switch; and
a plurality of second inductors, each second inductor connected between a corresponding throw and ground.

2. The front end module of claim 1 wherein the single tuning inductor is a surface mount device.

3. The front end module of claim 1 wherein the single tuning inductor has a first end in communication with the antenna and the antenna switch.

4. The front end module of claim 1 wherein the tuning switch is a single pole triple throw switch.

5. The front end module of claim 1 wherein the tuning switch and the plurality of second inductors provide additional tuning capability.

6. The front end module of claim 1 wherein the tuning switch and the plurality of second inductors are implemented as embedded traces on a multi-layer circuit board.

7. The front end module of claim 1 wherein the plurality of second inductors are surface mount devices.

8. The front end module of claim 1 wherein an antenna switching module includes the antenna switch.

9. A multi-band radio frequency device comprising:
an antenna configured to receive and transmit radio frequency signals within a plurality of frequency bands;
a plurality of duplexers, each duplexer configured to receive radio frequency signals within a specific frequency band of the plurality of frequency bands; and
an antenna switching module in communication with an antenna and having a plurality of switch positions, the antenna switching module configured to provide communication, responsive to a control signal, between the antenna and a selected duplexer of the plurality of duplexers;
a single tuning inductor configured to provide tuning for the antenna switching module for each of the plurality of switch positions, the single tuning inductor having a first end in communication with the antenna and the antenna switching module; and
a tuning switch having a pole and a plurality of throws, wherein the single tuning inductor has a second end in communication with the pole of the tuning switch.

10. The multi-band radio frequency device of claim 9 further comprising a plurality of second inductors, wherein each second inductor is connected between a corresponding throw and ground.

11. The multi-band radio frequency device of claim 9 wherein the tuning switch is switched, responsive to a second control signal, to place a selected second inductor in series with the single tuning inductor.

12. The multi-band radio frequency device of claim 10 wherein the tuning switch and the plurality of second inductors provide additional tuning capability.

13. The multi-band radio frequency device of claim 10 wherein the tuning switch and the plurality of second inductors are implemented as embedded traces on a multi-layer circuit board.

14. The multi-band radio frequency device of claim 10 wherein the plurality of second inductors are surface mount devices.

15. A front end module comprising:
a plurality of duplexers, each duplexer configured to transmit and receive radio frequency signals within a specific frequency band of a plurality of frequency bands;
an antenna switch in communication with an antenna and having a plurality of switch positions, the antenna switch configured to provide communication, responsive to a control signal, between the antenna and a selected duplexer of the plurality of duplexers;
a single tuning inductor configured to provide tuning for the antenna switch for each of the plurality of switch positions, the single tuning inductor having a first end in communication with the antenna and the antenna switch; and
a tuning switch having a pole and a plurality of throws, wherein the single tuning inductor has a second end in communication with the pole of the tuning switch.

16. The front end module of claim 15 wherein the single tuning inductor is a surface mount device.

17. The front end module of claim 15 wherein the tuning switch is a single pole triple throw switch.

18. The front end module of claim 15 wherein an antenna switching module includes the antenna switch.

* * * * *